United States Patent [19]
Higurashi

[11] Patent Number: 6,137,648
[45] Date of Patent: Oct. 24, 2000

[54] MAGNETIC TAPE AND A METHOD FOR RECORDING AND REPRODUCING A PLURALITY OF DIFFERENT INFORMATION SIGNALS ON AND FROM THE MAGNETIC TAPE

[75] Inventor: Seiji Higurashi, Fuchu, Japan

[73] Assignee: Victor Company of Japan, Ltd., Yokohama, Japan

[21] Appl. No.: 08/882,469

[22] Filed: Jun. 25, 1997

Related U.S. Application Data

[63] Continuation of application No. 08/561,803, Nov. 22, 1995, abandoned.

[30] Foreign Application Priority Data

Nov. 25, 1994 [JP] Japan ..................................... 6-315558

[51] Int. Cl.⁷ .................................................. G11B 21/04
[52] U.S. Cl. .......................... 360/70; 360/77.14; 360/132
[58] Field of Search ................................. 360/76, 70, 64, 360/75, 77.15, 77.14, 77.12, 132, 134

[56] References Cited

U.S. PATENT DOCUMENTS

| | | | |
|---|---|---|---|
| 4,197,562 | 4/1980 | Kikuya | 360/64 |
| 4,445,151 | 4/1984 | Kinoshita et al. | 360/27 |
| 4,607,297 | 8/1986 | Sonoda | 360/64 |
| 4,958,242 | 9/1990 | Aoki | 360/27 |
| 5,189,568 | 2/1993 | Sim et al. | 360/73.13 |
| 5,381,280 | 1/1995 | Lee | 360/64 |
| 5,563,745 | 10/1996 | Kim | 360/64 X |

FOREIGN PATENT DOCUMENTS

| | | |
|---|---|---|
| 0 421 417 | 4/1991 | European Pat. Off. . |
| 3600475 | 7/1986 | Germany . |
| 3419134 | 11/1994 | Germany . |
| 33405 | 2/1982 | Japan ........................ 360/64 |

*Primary Examiner*—Alan T Faber
*Attorney, Agent, or Firm*—Anderson, Kill & Olick P.C.

[57] ABSTRACT

In an information signal recording method for recording one information signal on slant tracks formed on a magnetic tape housed in tape cassette usable in a conventional magnetic recording and reproducing apparatus capable of reproducing another information signal by using a plurality of rotary heads and recording a control signal used as a reference in a tracking control during reproducing operation on the magnetic tape, a digital information signal is recorded by shifting rotation phase of the rotary head which is determined on the basis of a control signal 21a by about 180 degrees with respect to rotation phase of the rotary head during the recording of an analog information signal.

6 Claims, 7 Drawing Sheets

MAGNETIC TAPE AND A METHOD FOR RECORDING AND REPRODUCING A PLURALITY OF DIFFERENT INFORMATION SIGNALS ON AND FROM THE MAGNETIC TAPE

This application is a continuation of application Ser. No. 08/561,803, filed Nov. 22, 1997 abandoned.

BACKGROUND OF THE INVENTION

1. Field of the Invention

The present invention relates to a magnetic recording method, a magnetic tape and a magnetic recording and reproducing method.

2. Description of the Prior Art

As a video tape recorder (VTR) for recording and reproducing a video signal, a VTR of the VHS system has been well known. In such VTR, a video signal is recorded on slant tracks formed on a magnetic tape obliquely to a longitudinal direction of the magnetic tape by utilizing rotary video heads mounted on a rotary drum and an audio signal is bias-recorded on a track formed on the magnetic tape in the longitudinal direction thereof by utilizing a stationary head. On the other hand, in order to record and reproduce an audio signal of high quality, the deep layer audio recording and reproducing system has been employed, in which, after a frequency modulated audio signal (referred to as simply "FM audio signal", hereinafter) is recorded in a deep portion of slant tracks on a magnetic tape by using rotary audio heads mounted preceeding to rotary video heads, a video signal is recorded in a surface portion of the slanted tracks on the tape by using the rotary video heads.

During a reproducing operation of the deep layer audio recording and reproducing system, it is determined, by detecting a level of signal obtained from the rotary audio heads, whether or not the FM audio signal is recorded on the magnetic tape. That is, when the level is low enough, it is determined that there is no FM audio signal recorded on the magnetic tape and, when the level is high enough, it is determined that there is an FM audio signal recorded on the tape. Incidentally, since the azimuth angle of the rotary audio heads is different from that of the rotary video heads, the rotary audio heads do not reproduce a video signal recorded on the magnetic tape and thus the video signal is not erroneously determined as an FM audio signal.

On the other hand, an analog/digital VTR for recording and reproducing a digital signal in addition to an analog video and audio signals can be realized by simply making a tape speed and a track pattern for the digital signal the same as those of the VHS or 8 mm vide system. In such case, since there may be a case where only analog signals are recorded on a magnetic tape by the analog/digital VTR, it is required, necessarily, that the magnetic tape on which the analog signals are recorded by the analog/digital VTR can be reproduced by a conventional VTR.

However, when a magnetic tape on which a digital signal is recorded by the analog/digital VTR is reproduced by the conventional VTR, there may be a case where the conventional VTR erroneously determines a frequency spectrum of the reproduced digital information signal signal as a spectrum of a reproduced FM audio signal and produces an audio output with large noise, since the frequency spectrum of digital signal is distributed over a wide frequency band covering a frequency band of the reproduced FM audio signal.

BRIEF SUMMARY OF THE INVENTION

An object of the present invention is to provide an information signal recording method, a magnetic tape and an information signal recording and reproducing method, with which, even when a magnetic tape on which a digital signal is recorded is reproduced by a conventional VTR, the conventional VTR does not erroneously determine the digital signal as an FM audio signal and does not produce an audio output with the digital signal as large noise.

Another object of the present invention is to provide an information signal recording method for recording, on slant tracks formed on a magnetic tape obliquely with respect to a longitudinal direction thereof, the magnetic tape being housed in a magnetic tape cassette usable in another magnetic recording and reproducing apparatus capable of reproducing one information signal, another information signal by using rotary heads having different azimuth angles, which method comprises the steps of recording a control signal used as a reference in a tracking control during a reproducing operation on a longitudinal track formed on the magnetic tape in a longitudinal direction thereof and recording the another information signal by shifting a rotation phase of the rotary heads which is determined on a basis of the control signal by about 180 degrees with respect to rotation phase of the rotary heads during a recording of the one information signal.

Another object of the present invention is to provide an information signal recording method for selectively recording one information signal or another information signal on slant tracks formed on a magnetic tape obliquely with respect to a longitudinal direction thereof, the magnetic tape being housed in a tape cassette usable in another magnetic recording and reproducing apparatus capable of reproducing the one information signal, by using rotary heads having different azimuth angles, which comprises the steps of recording a control signal used as a reference in a tracking control during reproducing operation on a longitudinal track formed on the magnetic tape in a longitudinal direction thereof, recording the one information signal such that rotation phase of the rotary heads becomes a predetermined phase with respect to the control signal during a recording operation of the one information signal and recording the another information signal by shifting rotation phase of the rotary heads which is determined on a basis of the control signal by about 180 degrees with respect to the predetermined phase during a recording operation of the another information signal.

Another object of the present invention is to provide a magnetic tape housed in a tape cassette usable in a conventional magnetic recording and reproducing apparatus capable of reproducing one information signal and having slant tracks formed thereon obliquely with respect to a longitudinal direction thereof on which the another information signal is azimuth-recorded and a longitudinal track formed thereon in the longitudinal direction thereof on which a control signal which becomes a reference for a tracking in a reproducing operation is recorded, wherein the another information signal is recorded with a relation between the control signal and the azimuth angle of the slant tracks during the recording operation of the another information signal being reversed during the recording operation of the one information signal.

A further object of the present invention is to provide an information signal recording and reproducing method for selectively recording one information signal or another information signal on slant tracks formed on a magnetic tape obliquely with respect to a longitudinal direction thereof, the magnetic tape being housed in a tape cassette usable in another magnetic recording and reproducing apparatus capable of reproducing the one information signal, by using rotary heads having different azimuth angles each other, and for reproducing the recorded magnetic tape, which method comprises the steps of recording a control signal used as a reference in a tracking control during the reproducing operation on the magnetic tape, recording the one information signal such that rotation phase of the rotary heads becomes a predetermined phase with respect to the control signal during the recording operation of the one information signal, recording the another information signal by shifting rotation phase of the rotary heads which is determined on a basis of the control signal by about 180 degrees with respect to the predetermined phase during the recording of the another information signal and running the magnetic tape on a basis of the control signal reproduced from the magnetic tape to reproduce the one information signal or the another information signal by the rotary heads.

DETAILED DESCRIPTION OF THE INVENTION

An embodiment of the present invention will be described with reference to the accompanying drawings.

A magnetic recording and reproducing apparatus according to this invention is adapted to selectively record and reproduce an analog video and audio signals or a digital signal by using common magnetic heads and a common rotary drum or to record and reproduce a digital signal. In an embodiment, the magnetic recording and reproducing apparatus is operable in a first mode in which an analog video signal and an analog audio signal are recorded and reproduced and in a second mode in which a digital signal is recorded and reproduced. A tape cassette housing a magnetic tape to be recorded by such apparatus can be used in a conventional magnetic recording and reproducing apparatus capable of reproducing an analog video signal and an analog audio signal. That is, the magnetic tape recorded in the first mode can be reproduced by the conventional magnetic recording and reproducing apparatus.

Figure 1:
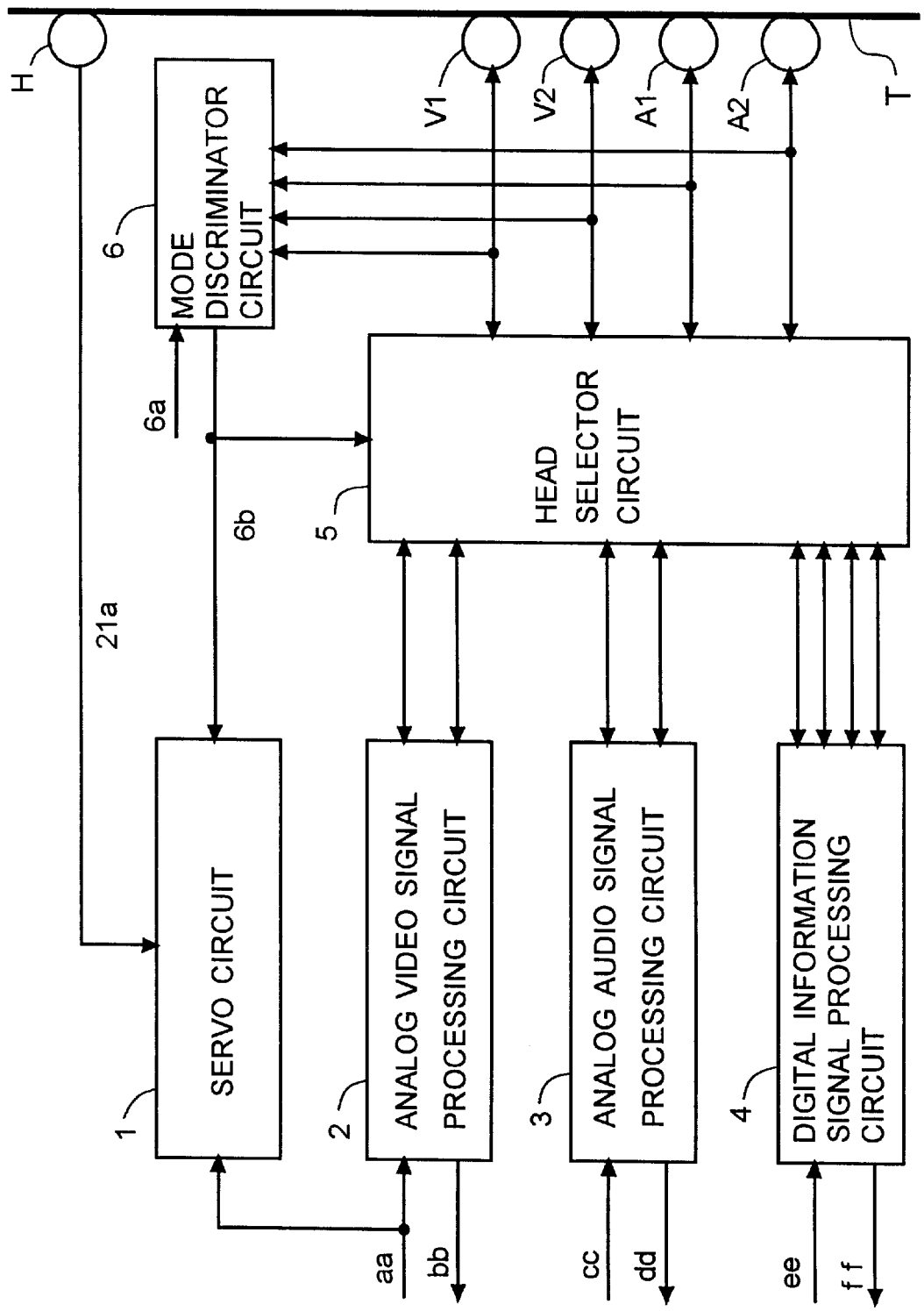
FIG. 1 is a block diagram showing an embodiment of a magnetic recording and reproducing apparatus according to the present invention.

FIG. 1 is a block diagram of an embodiment of a magnetic recording and reproducing apparatus according to the present invention. In FIG. 1, when the apparatus is in the first mode, an input analog video signal aa and an input analog audio signal cc are supplied to an analog video signal processing circuit 2 and an analog audio signal processing circuit 3, respectively. The analog video signal processing circuit 2 separates the input video signal aa to a luminance signal Y and a color signal C and then pre-emphasizes, clips and frequency-modulates the luminance signal Y and frequency-converts the color signal C into a low frequency band. Then, the frequency-modulated luminance signal and the frequency-converted color signal are mixed to produce a recording video signal. The analog audio signal processing circuit 3 frequency-modulates the input audio signal cc to produce a recording audio signal.

The recording video signal thus produced is supplied to a first and second rotary video heads V1 and V2 through a head selector circuit 5 and the recording audio signal is supplied to a first and second rotary audio heads A1 and A2 through the head selector circuit 5.

Figure 2:
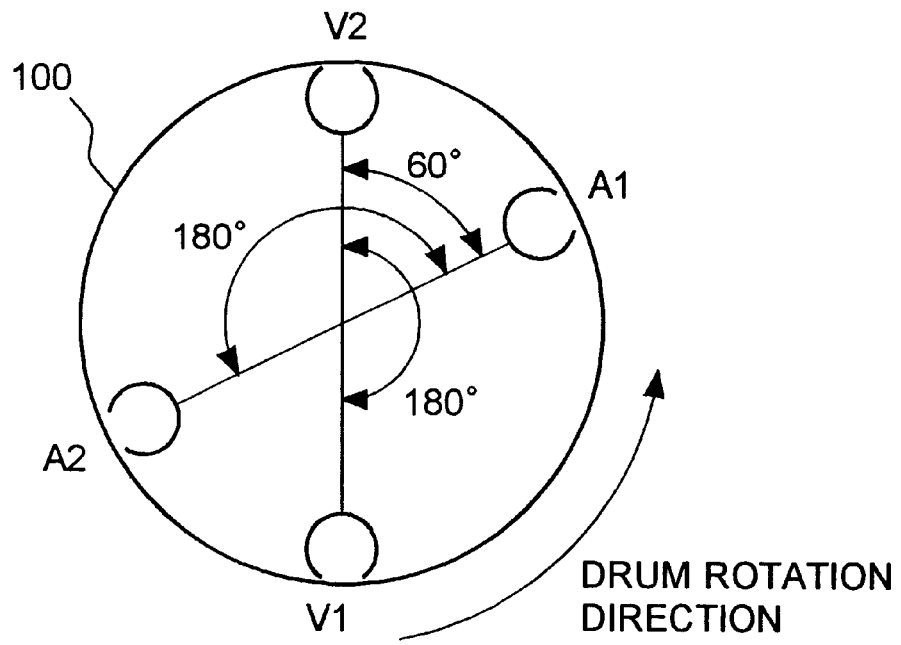
FIG. 2 illustrates a rotary drum of the magnetic recording and reproducing apparatus shown in FIG. 1, with various heads thereon.
Figure 3:
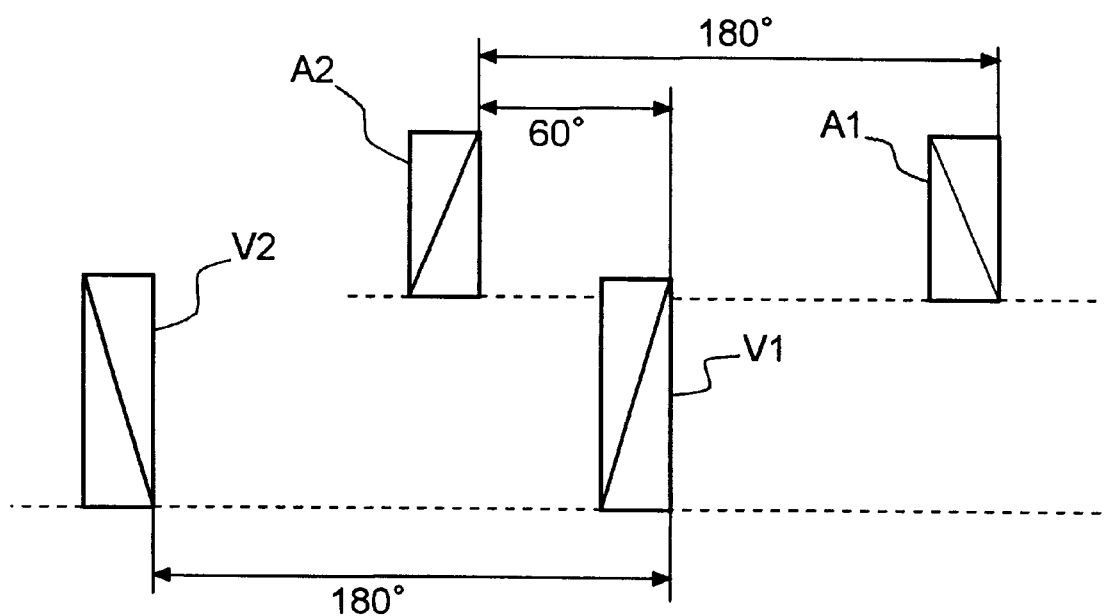
FIG. 3 shows a positional relation of the various magnetic heads on the rotary drum.

As shown in FIG. 2, the first and second rotary video heads V1 and V2 are arranged in opposite positions on a rotary drum 100 and the first and second rotary audio heads A1 and A2 are similarly arranged in opposite positions on the rotary drum 100. Further, as shown in FIG. 3, the first and second rotary video heads V1 and V2 are in a level of the rotary drum 100 and the first and second rotary audio heads A1 and A2 are in a level of the rotary drum 100 which is different from the level on which the first and second rotary video heads V1 and V2 are mounted. Azimuth angles of the first and second rotary video heads V1 and V2 are, for example, +6 degrees and −6 degrees respectively and the first and second rotary audio heads A1 and A2 are, for example, +30 degrees and −30 degrees respectively.

After the first rotary audio head A1 records the recording audio signal in a deep portion of a track formed obliquely with respect to a longitudinal direction of a magnetic tape, the first rotary video head V1 records the recording video signal in a surface portion of the track. Thus, the so-called depth recording of the audio signal is performed. This is the same for the second rotary audio head A2 and the second rotary video head V2.

In the second mode, an input digital signal ee is supplied to a digital information signal processing circuit 4 in which an error correction code and a sync information signal, etc., are attached to the input digital signal ee. Then, the resultant signal is digitally modulated in a predetermined manner to produce a recording digital signal. The recording digital signal is supplied to the first and second rotary video heads V1 and V2 and the first and second rotary audio heads A1 and A2 through the head selector circuit 5 and recorded on a magnetic tape T.

In the described manner, the analog video and audio signals or the digital signal is selectively recorded on the magnetic tape T. A discrimination between the first mode and the second mode may be performed automatically on the basis of presence or absence of the analog video signal or the digital signal supplied to this apparatus. However, in this embodiment, a mode discriminating circuit 6 determines the mode on the basis of a signal 6a supplied manually from an input device (not shown) operated by an operator to produce a mode control signal 6b which is supplied to the head selector circuit 5 and a servo circuit 1. The recording head selection in the head selector circuit 5 is performed on the basis of the mode control signal 6b.

Figure 4:
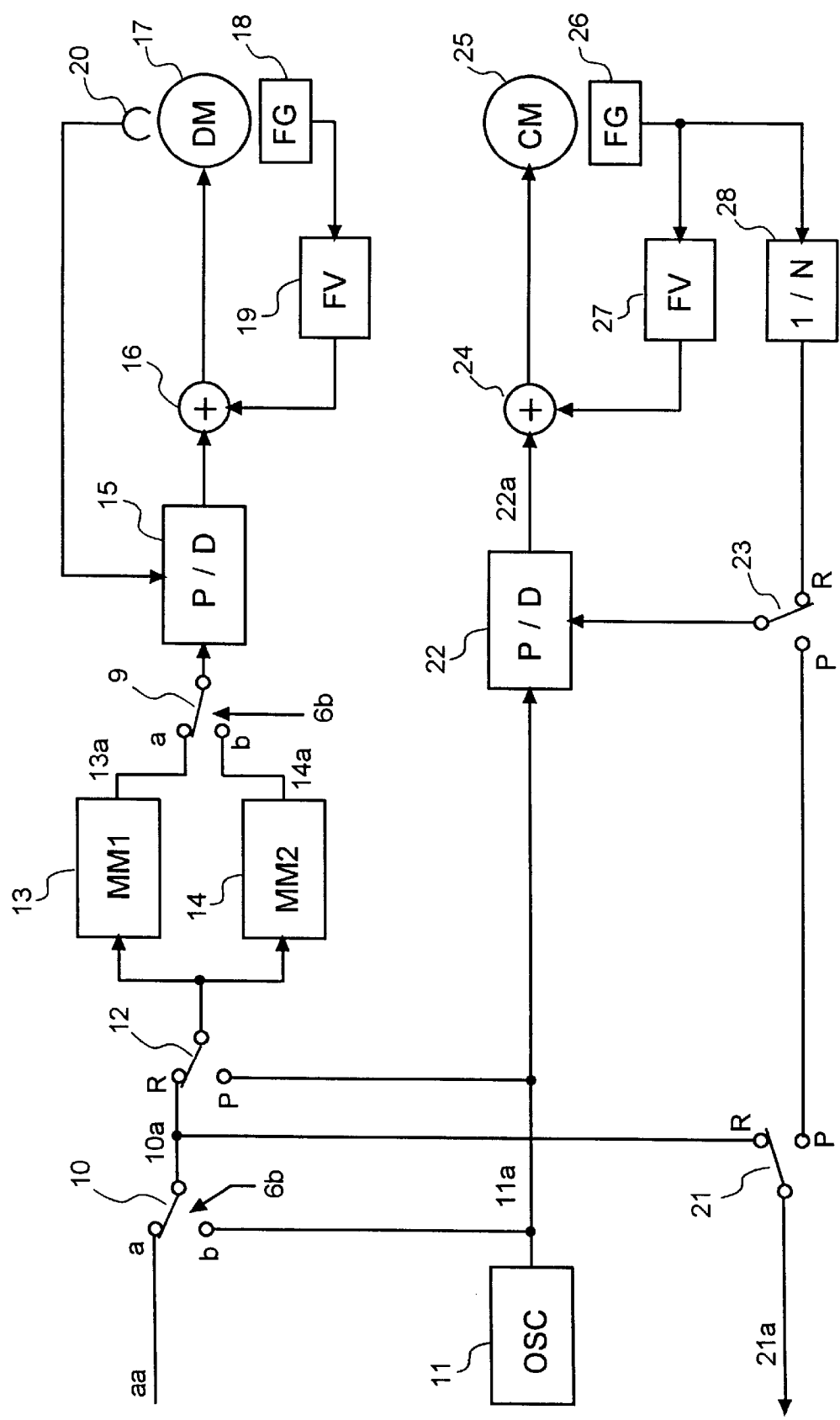
FIG. 4 is a block diagram of a servo circuit of the magnetic recording and reproducing apparatus in FIG. 1.

The servo circuit 1 which is one of features of the present invention will be described with reference to FIGS. 4 and 5. In FIG. 4, the servo circuit 1 includes a drum servo system for controlling rotation of the rotary drum and a capstan servo system for driving the magnetic tape T. The drum servo system is composed of a quartz oscillator 11, a switch 9, a first switch 10, a second switch 12, mono-stable multivibrators 13 and 14, a phase comparator 15, an adder 16, a drum motor 17, a frequency generator 18, a frequency-voltage converter 19 and a drum pulse generator 20. The capstan servo system for driving the magnetic tape T is composed of the quartz oscillator 11, third and fourth switches 21 and 23, a phase comparator 22, an adder 24, a capstan motor 25, a frequency generator 26, a frequency-voltage converter 27 and a frequency divider 28. The second, third and fourth switches 12, 21 and 23 are switched between a recording mode and a reproducing mode by connections of movable terminals thereof to recording terminals R and reproducing terminals P, respectively.

Describing first an operation of the drum servo system in a recording mode, a vertical sync signal separated from the input video signal aa is supplied to a terminal a of the first switch 10. On the other hand, a reference signal 11a is supplied from the quartz oscillator 11 to a terminal b of the switch 10. The switch 10 is under control of the mode control signal 6b such that it selects and outputs the vertical sync signal supplied to the terminal a when the mode control signal 6b is indicative of the first mode in which the analog video and audio signals are recorded and selects and outputs the reference signal 11a supplied to the terminal b when the mode control signal 6b is indicative of the second mode in which the digital signal is recorded. In the second mode, however, when an external sync signal is used, the switch 10 selects and outputs the vertical sync signal at the terminal a. The signal output from the switch 10 becomes the reference signal in the recording mode of the drum servo system.

The signal from the switch 10 is supplied to the first and second mono-stable multivibrators 13 and 14 through the terminal R of the switch 12. The first and second mono-stable multivibrators 13 and 14 function to make a phase relation between rotation phase of the rotary heads and a control signal to be described later in the first mode different from that in the second mode.

Output signals 13a and 14a of the mono-stable multivibrators 13 and 14 are supplied to the terminals a and b of the switch 9, respectively. The switch 9 selects the output signal 13a or 14a according to the mode control signal 6b and supplies the selected signal to the phase comparator circuit 15. The phase comparator circuit 15 compares in phase the output signal of the switch 9 with a drum pulse 20a supplied from the pulse generator 20, which is indicative of rotational phase of the rotary heads, and a resultant phase error signal is supplied to one input of the adder 16. That is, when the mode control signal 6b indicates the first mode, the output signal 13a is compared in phase with the drum pulse 20a and, when the mode control signal 6b indicates the second mode, the output signal 14a is compared in phase with the drum pulse 20a.

A pulse signal generated by the frequency generator 18 and having frequency proportional to rotation speed of the drum motor 17 is supplied to the frequency-voltage converter 19 in which a voltage signal having a voltage value corresponding to rotation speed of the drum motor 17 is generated. The speed control of the drum motor 17 is performed by supplying an output signal of the frequency-voltage converter 19 to the other input of the adder 16.

The reference signal 10a passed through the switch 10 is supplied to the fixed head shown in FIG. 1 through the terminal R of the switch 21 as the control signal 21a and recorded on a control track formed on the magnetic tape T in the longitudinal direction thereof.

Next, the relation between the rotation phase of the rotary drum and the control signal will be described with reference to FIG. 5. FIG. 5A shows a waveform of the reference signal 10a. FIGS. 5B and 5E show waveforms of the output signals 13a and 14a of the mono-stable multi-vibrators 13 and 14 which rise in synchronism with a rising edge of the reference signal 10a and fall after times ta and tb lapse, respectively. The time constant tb is set such that it becomes equal to a sum of the time constant ta and a time required for a half revolution (180 degrees) of the rotary drum.

Figures 5A, 5B, 5C, 5D, 5E, 5F, 5G:
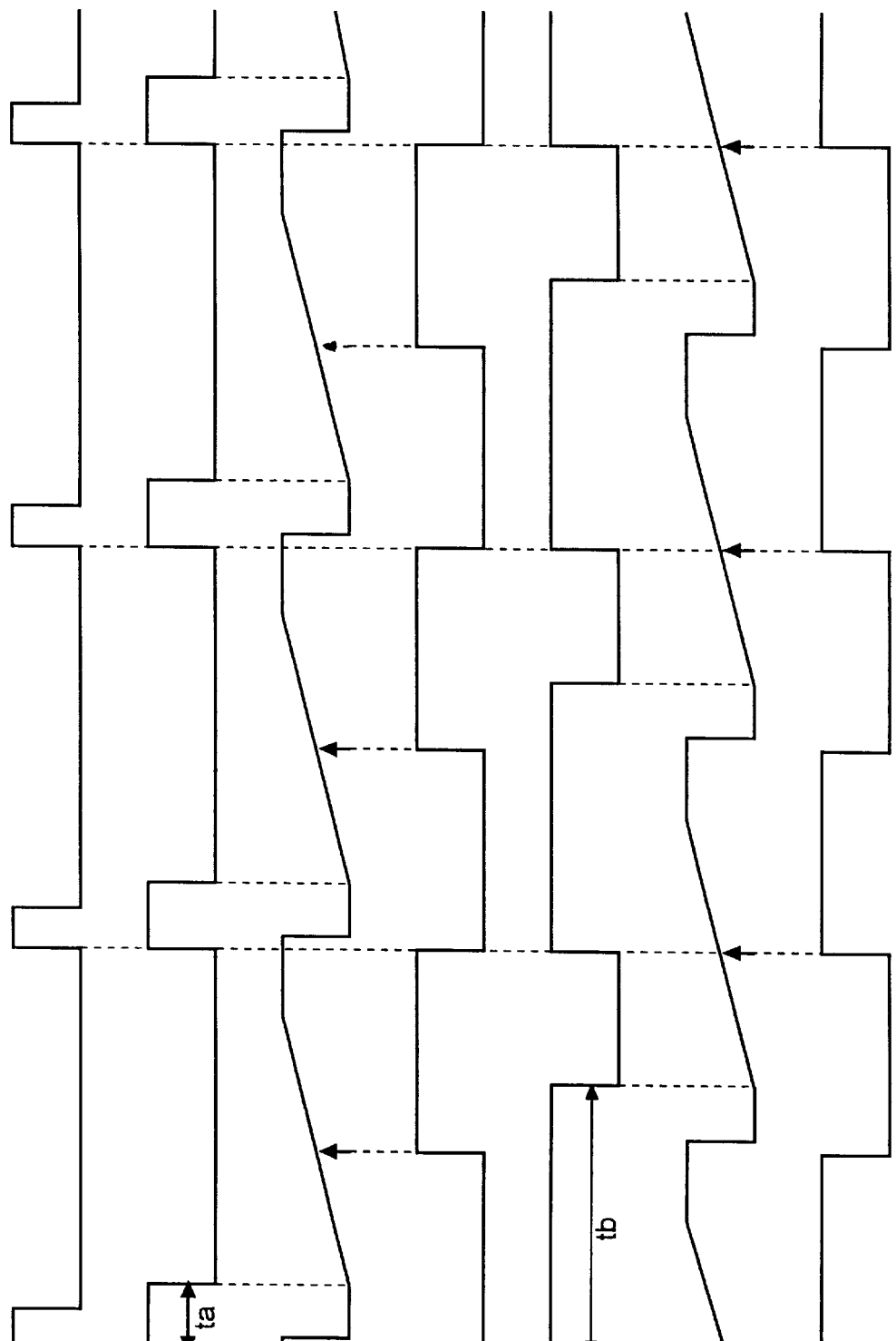
FIGS. 5A through 5G are timing charts of operations of the servo circuit.

In the phase comparator 15, trapesoidal waveforms shown in FIGS. 5C and 5F and having slope portions starting in synchronism with the falling edges of the output signals 13a and 14a are generated, respectively, and the phase error signal 15a is produced by sampling/holding these trapesoidal waveforms at the rising edge of the drum pulse 20a shown in FIGS. 5D and 5G.

Therefore, there is a constant phase relation between the drum pulse 20a indicative of rotation phase of the rotary drum and the trapesoidal waveforms and between the trapesoidal waveforms and the reference signal 10a and, further, there is a constant phase relation between rotation of the rotary drum and the control signal 21a since the reference signal 10a is recorded on the magnetic tape as the control signal 21a. Further, as shown in FIGS. 5D and 5G, rotation phases of the rotary drum with respect to the control signal 21a (equivalent to the reference signal 10a shown in FIG. 5A) in the first mode and in the second mode are different from each other by 180 degrees. That is, the recording in the second mode is performed by shifting rotation phase of the rotary drum, that is, the rotary heads, which is determined on the basis of the control signal 21a by 180 degrees with respect to rotation phase of the rotary drum in the recording in the first mode. As a result, when the magnetic tape recorded in the second mode is reproduced by the conventional VTR which reproduces in only the first mode, it is possible to reduce the reproduced level reproduced by the rotary audio head since the track is reproduced by the head having azimuth angle opposite to that of the head used in the recording.

In the reproduction, instead of the reference signal 10a, the reference signal 11a supplied to the terminal P of the second switch 12 is supplied to the first and second mono-stable multivibrators 13 and 14 and the subsequent drum servo is performed similarly to the case of recording operation.

Next, the capstan servo system will be described with reference to FIG. 4. The reference signal 11a from the quartz oscillator 11 is supplied to one input of the phase comparator 22. During a recording operation, the output pulse signal generated by the frequency generator 26 and having frequency proportional to rotation speed of the capstan motor 25 is frequency-divided by the frequency divider 28. The output of the frequency divider 28 is supplied to the other input of the phase comparator 22 through the terminal R of the switch 23. During a reproducing operation, the other input of the phase comparator 22 is supplied with the reproduced control signal 21a through the terminals P of the switches 21 and 23.

The phase error signal 22a output from the phase comparator 22 is supplied to one input of the adder 24 having the other input supplied with a signal obtained by converting frequency of the output of the frequency generator 26 into a voltage by means of the frequency-voltage converter 27. The rotation of the capstan motor 25 and hence the running speed of the magnetic tape T is controlled in the described manner on the basis of the output of the adder 24.

As mentioned above, since there is the constant phase relation between rotation of the rotary drum and the reference signal 11a during the reproduction and there is also the constant phase relation between the reference signal 11a and the reproduced control signal 21a, there is a constant phase relation between rotation of the rotary drum and the reproduced control signal 21a, necessarily. Therefore, when the phase relation between rotation of the rotary drum and the control signal 21a during the recording operation is switched between the first and second modes as mentioned above and when the magnetic tape recorded in the second mode is reproduced by the conventional apparatus which reproduces in only the first mode, the track is reproduced by the head having azimuth angle opposite to that of the head used in the recording operation, so that it is possible to reduce the reproduced level.

Figure 6A:
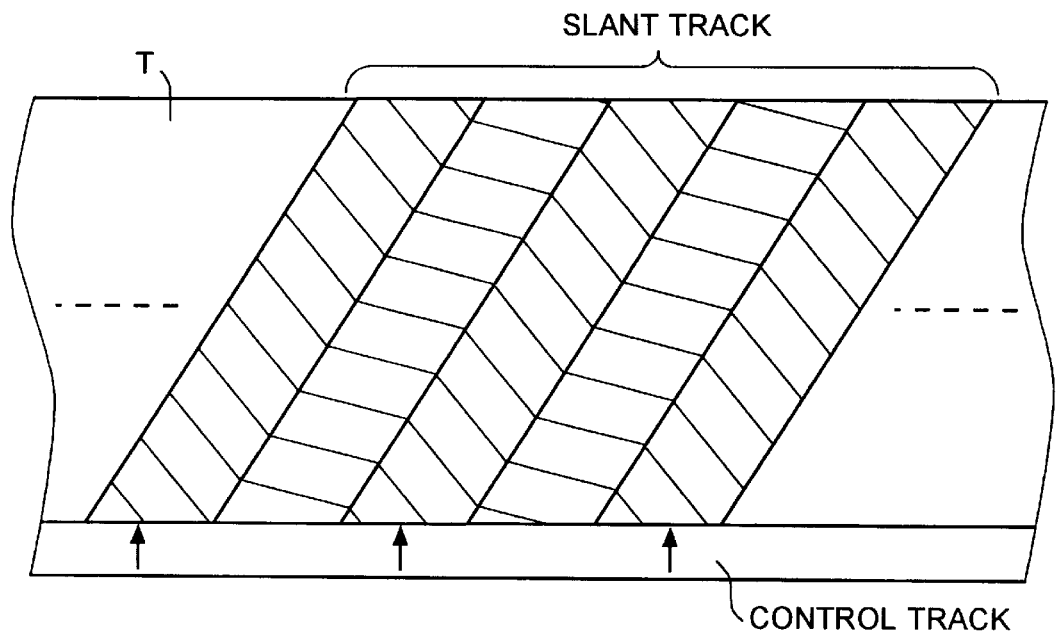
FIGS. 6A and 6B show tape patterns.
Figure 6B:
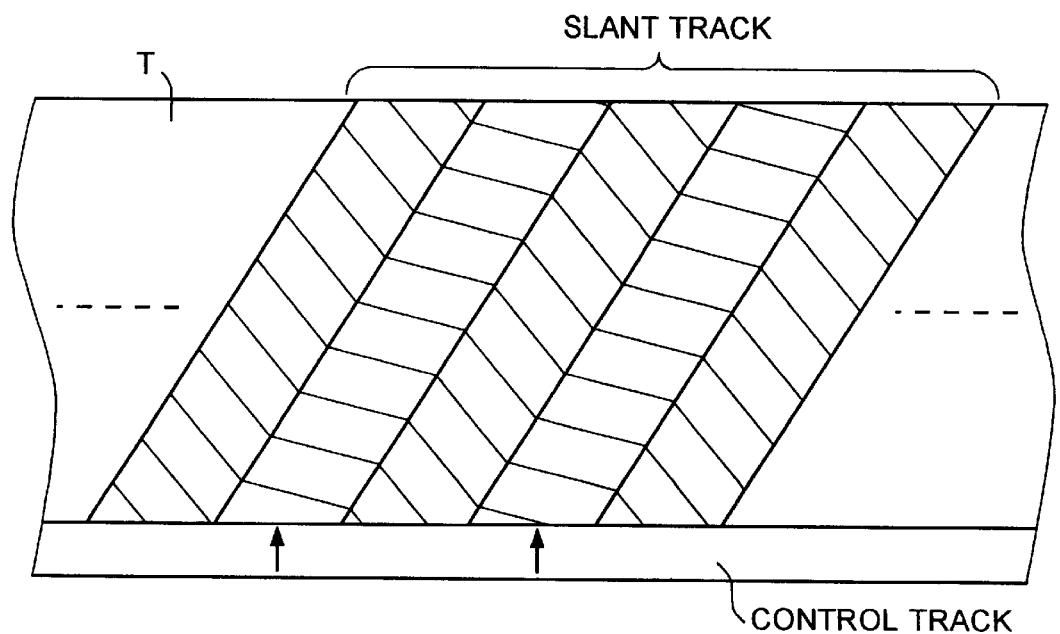

The tape patterns recorded in the first and second modes will be described with reference to FIGS. 6A and 6B, respectively. In FIGS. 6A and 6B, arrows in the control tracks indicate recording positions of rising edges of the control signal, and slant lines in the slant tracks show the azimuth angles recorded. The servo during reproduction is performed with using the rising edges of the control signal as references.

Comparing FIG. 6A with FIG. 6B, a relation of the recording positions of the control signal and the azimuth angles of the slant tracks is reversed. As a result, when the magnetic tape shown in FIG. 6B related to the second mode is reproduced by the conventional apparatus which can reproduce in only the first mode, the tracks are reproduced by the head having azimuth angle which is opposite to that during the recording and thus it is possible to reduce the reproduced level. Therefore, there is no possibility that the digital signal recorded is erroneously recognized as the FM audio signal and thus there is no large noise overlapped on the audio output.

Figure 7:
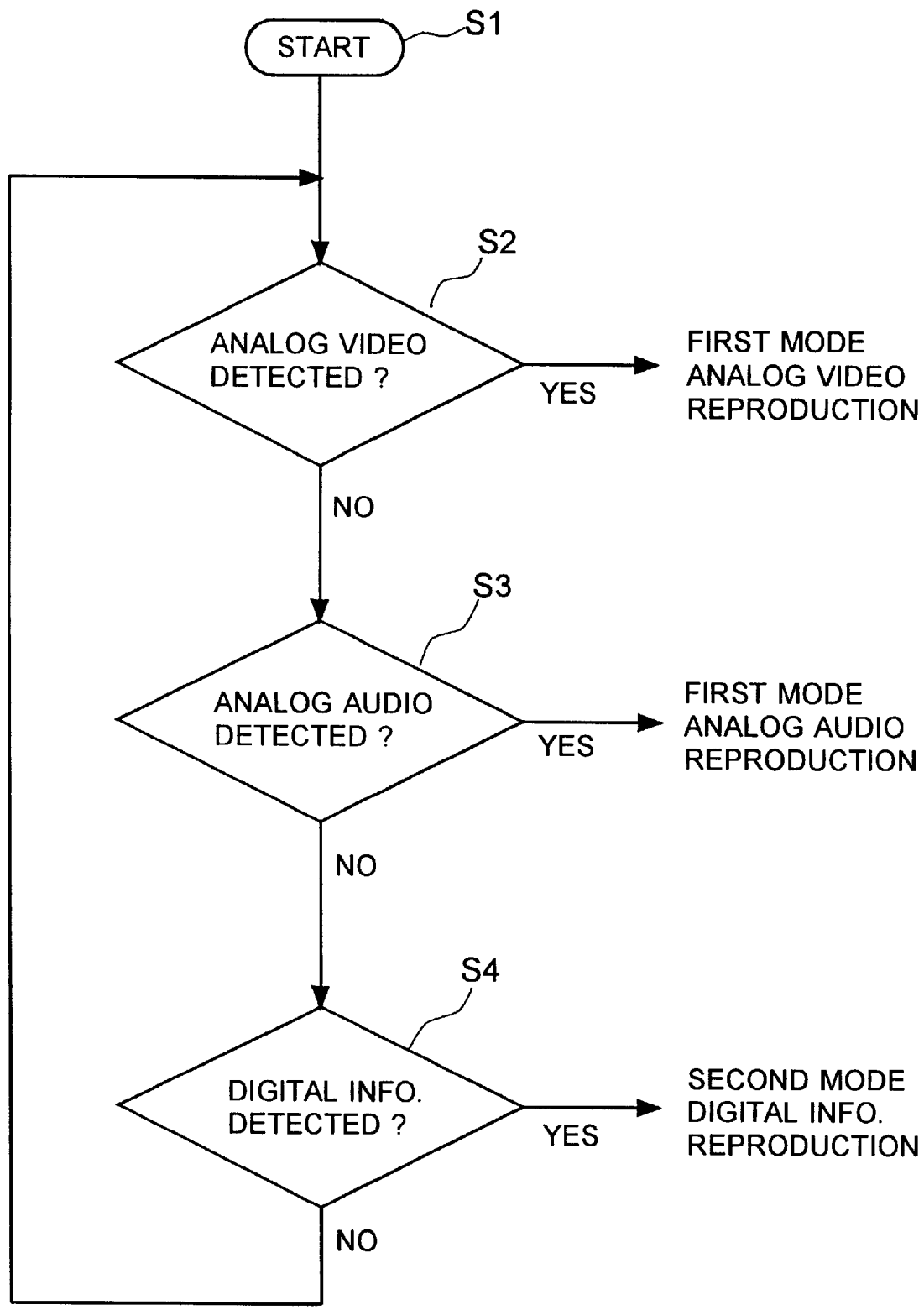
FIG. 7 is a flowchart for mode discrimination.

A mode discrimination during the reproducing operation, which is to be performed by the mode discriminator circuit 6 shown in FIG. 1 will be described with reference to FIG. 7. The mode discrimination is started in the step S1 and then it is determined in the step S2 whether or not an analog video signal is present. This determination is performed by setting the tracking during reproduction to the first mode, detecting reproduced signals from the first and second rotary video heads V1 and V2 and comparing levels of the detected signals with a predetermined threshold value level. When the level of the detected signal exceeds the threshold value level, it is determined as YES, that is, presence of an analog video signal in the first mode. When the detected signal level does not exceed the threshold value level, it is determined as NO, that is, absence of analog video signal, and the operation is shifted to the step S3.

In the step S3, it is determined whether or not there is an analog audio signal. This determination is performed by detecting reproduced signals from the first and second rotary audio heads A1 and A2 and comparing levels of the detected signals with a predetermined threshold value level. When the level of the detected signal exceeds the threshold value level, it is determined as YES, that is, presence of an analog audio signal in the first mode. When the detected signal level does not exceed the threshold value level, it is determined as NO, that is, absence of analog audio signal, and the operation is shifted to the step S4.

In the step S4, it is determined whether or not there is a digital information signal. This determination is performed by switching the tracking during reproduction from the first mode to the second mode, detecting reproduced signals from the first and second rotary video heads V1 and V2 and the first and second rotary audio heads A1 and A2 and comparing levels of the detected signals with a predetermined threshold value level. When the level of the detected signal exceeds the threshold value level, it is determined as YES, that is, the second mode. On the other hand, when the detected signal level does not exceed the threshold value level, it is determined as NO, that is, there is no recording on the magnetic tape, and the operation is shifted to the step S2. The steps S2 through S4 are repeated until a required mode is determined.

Returning to FIG. 1, the reproducing operation will be described. The mode control signal 6b produced by the mode discriminating circuit 6 is supplied to the head selector circuit 5. When the mode control signal 6b indicates the first mode, the head selector circuit 5 supplies the reproduced signals from the first and second rotary video heads V1 and V2 and the first and second rotary audio heads A1 and A2 to the analog video signal processing circuit 2 and the analog audio signal processing circuit 3. On the other hand, when the mode control signal 6b indicates the second mode, the head selector circuit 5 supplies the reproduced signals from the first and second rotary video heads V1 and V2 and the first and second rotary audio heads A1 and A2 to the digital information signal processing circuit 4.

The analog video signal processing circuit 2, the analog audio signal processing circuit 3 and the digital information signal processing circuit 4 process the reproduced signals complementary with respect to the recording operation to produce the output video signal bb, the output audio signal dd and the output digital information signal ff, respectively.

Figure 8A:
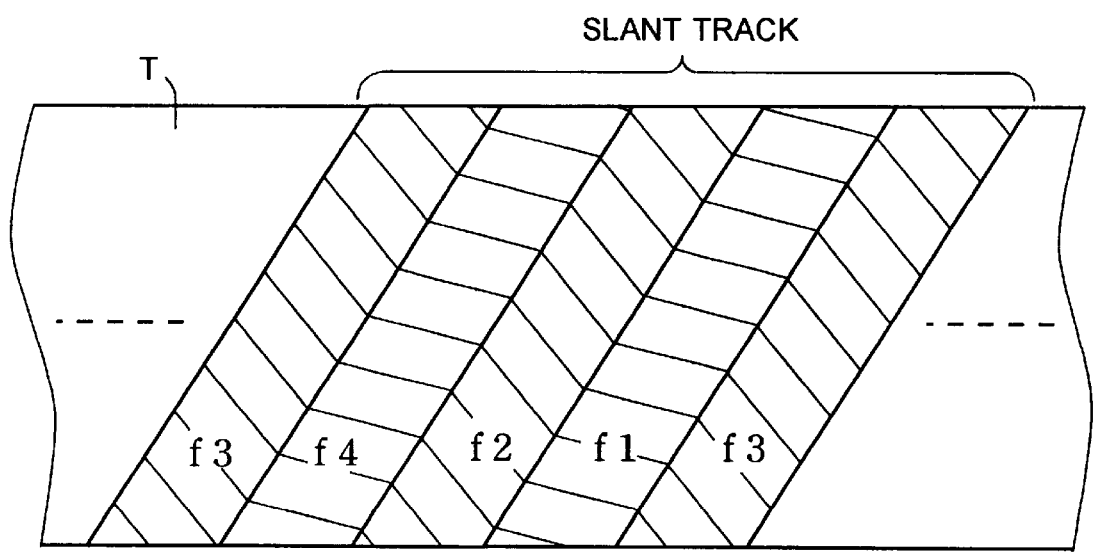
FIGS. 8A and 8B show tape patterns.
Figure 8B:
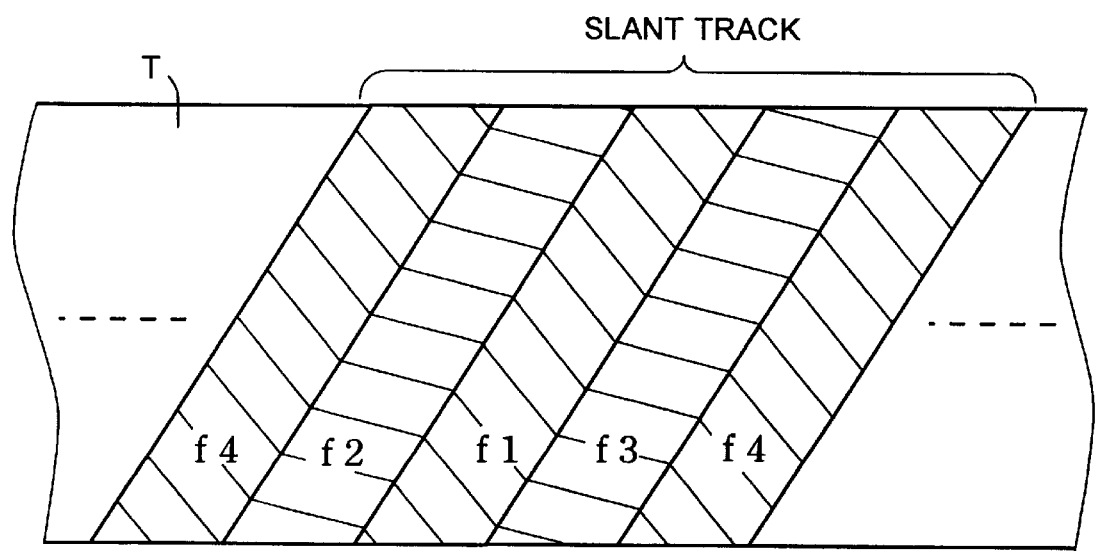

Although, in the embodiment mentioned above, the control signal which is the reference for the tracking control during the reproducing operation has been described as being recorded on the control track, the present invention is applicable to the automatic tracking finding (ATF) system which is used in the 8 mm video system, etc. In the first mode of the ATF system, four pilot signals f3, f1, f2 and f4 which have constant frequencies in a frequency range lower than the low frequency converted color signal frequency are recorded on respective slant tracks sequentially in the order as shown in FIG. 8A. That is, in the first mode, pilot signals f1 and f4 are recorded in the slant tracks having azimuth angle of +10 degrees for example, and pilot signals f2 and f3 are recorded in the slant tracks having azimuth angle of −10 degrees for example. On the contrary, in the second mode of the ATF system, the four pilot signals f4, f3, f1 and f2 are sequentially recorded in the order on the respective tracks as shown in FIG. 8B. That is, in the second mode, pilot signals f2 and f3 are recorded in the slant tracks having azimuth angle of +10 degrees for example, and pilot signals f1 and f4 are recorded in the slant tracks having azimuth angle of −10 degrees for example.

That is, in the present invention, the control signal which is used as the reference signal during the reproducing operation may be either the control signal recorded on the control track or the pilot signals recorded on the slant tracks. In the second mode, the digital information signal is recorded by shifting rotary phase of the rotary head which is determined on the basis of the control signal by about 180 degrees with respect to that in the first mode.

Although, in the described embodiment, the information signal to be recorded and reproduced in the first mode is an analog information signal such as the analog video information signal and the analog audio information signal and the information signal to be recorded and reproduced in the second mode is the digital information signal, the present invention is not limited to these kinds of information signal and it is enough to record one information signal in the first mode and another information signal in the second mode.

What is claimed is:

1. An information signal recording method for recording an analog and a digital information signal, using rotary heads, on slant tracks formed on a magnetic tape, obliquely with respect to a longitudinal direction thereof, said information signal recording method comprising the steps of:

recording, on said magnetic tape, a tracking control signal;

recording said analog information signal successively on said slant tracks formed on said magnetic tape using said tracking control signal to maintain a first rotation phase of said rotary heads; and recording said digital information signal successively on said slant tracks formed on said magnetic tape using said tracking control signal to shift a rotation phase of said rotary heads by substantially 180 degrees with respect to said first rotation phase of said rotary heads.

2. The information signal recording method claimed in claim 1, wherein said tracking control signal is recorded on a longitudinal track formed on said magnetic tape in the longitudinal direction thereof.

3. A magnetic tape housed in a tape cassette usable in a magnetic recording and reproducing apparatus capable of reproducing an analog information signal, said tape having a digital information signal azimuth-recorded on slant tracks formed thereon obliquely with respect to a longitudinal direction thereof and a tracking control signal recorded thereon, wherein said digital information signal is recorded using said tracking control signal to reverse the azimuth angle of the slant tracks from the azimuth angle used during the recording operation of said analog information signal.

4. The magnetic tape claimed in claim 3, wherein said tracking control signal is recorded on a longitudinal track formed on said magnetic tape in the longitudinal direction thereof.

5. An information signal recording and reproducing method for selectively recording an analog information signal or a digital information signal on slant tracks formed on a magnetic tape housed in a tape cassette usable in a magnetic recording and reproducing apparatus capable of reproducing said analog information signal, obliquely with respect to a longitudinal direction thereof, by using a plurality of rotary heads having different azimuth angles from each other, with respect to said tape and for reproducing information signals recorded on said magnetic tape, said information signal recording and reproducing method comprising the steps of:

recording a control signal for use as a reference signal in a tracking control operation during the reproduction of information signals, from said magnetic tape;

recording said analog information signal on said slant tracks successively, with a predetermined rotation phase of the rotary heads with respect to the control signal;

recording said digital information signal on said slant tracks successively by shifting a rotation phase of the rotary heads, with respect to the control signal, by about 180 degrees from said predetermined phase; and driving said magnetic tape to reproduce said analog information signal or said digital information signal by the plurality of rotary heads depending on said control signal reproduced from said magnetic tape.

6. The information signal recording and reproducing method claimed in claim 5, wherein the control signal is recorded and reproduced on and from a longitudinal track formed on said magnetic tape in the longitudinal direction thereof.

* * * * *